United States Patent [19]

Yang

[11] Patent Number: 5,615,023
[45] Date of Patent: Mar. 25, 1997

[54] HEAD-UP DISPLAY FOR AUTOMOBILE

[75] Inventor: Bong-Won Yang, Seoul, Rep. of Korea

[73] Assignee: Hyundai Electronics Industrial Co., Ltd., Kyoungki-do, Rep. of Korea

[21] Appl. No.: 363,536

[22] Filed: Dec. 23, 1994

[30] Foreign Application Priority Data

Dec. 24, 1993 [KR] Rep. of Korea ................. 1993-29636
Dec. 29, 1993 [KR] Rep. of Korea ................. 1993-30759

[51] Int. Cl.[6] .............................. G03H 1/00; G02B 5/32; H04N 7/00
[52] U.S. Cl. ............................ 359/13; 359/14; 359/15; 359/16; 359/630; 348/115
[58] Field of Search .................................. 359/2, 13, 15, 359/630, 14, 16; 345/7; 348/115

[56] References Cited

U.S. PATENT DOCUMENTS

| | | | |
|---|---|---|---|
| 4,001,499 | 1/1977 | Dowell | 348/115 |
| 4,592,620 | 6/1986 | Poole | 359/14 |
| 4,763,990 | 8/1988 | Wood | 359/13 |
| 5,037,166 | 8/1991 | Malcolm et al. | 359/15 |
| 5,085,514 | 2/1992 | Mallik et al. | 359/2 |
| 5,164,848 | 11/1992 | Firth | 359/13 |

Primary Examiner—Paul M. Dzierzynski
Assistant Examiner—Audrey Chang
Attorney, Agent, or Firm—Morgan & Finnegan, L.L.P.

[57] ABSTRACT

A head-up display for an automobile utilizing a light transmission hologram optical device as well as a light reflection hologram optical device. The head-up display is installed in a large truck or in a special freight car, such as a container car or a ready mixed concrete car, so that the head-up display informs a driver of information of conditions of dead ground of the car. The head-up display includes a hologram optical projection system and a holographic combiner. The projection system for projecting the light has a light source, an LCD for partially transmitting and shielding the light of the light source, and a light transmission hologram optical device for projecting the light. The holographic combiner for displaying the image includes a light reflection hologram optical device.

3 Claims, 7 Drawing Sheets

HEAD-UP DISPLAY FOR AUTOMOBILE

BACKGROUND OF THE INVENTION

1. Field of the Invention

The present invention relates in general to a head-up display using hologram optical devices for automobiles and, more particularly, to a head-up display using a light transmission hologram optical device as well as a light reflection hologram optical device for displaying automobile conditions, such as traveling velocity, rpm, fuel quantity and engine temperature, and a warning signal of opened window, on a holographic combiner mounted to a windshield of the automobile, and for displaying the conditions of dead ground of a large truck or of a special freight car, such as a container car or a ready mixed concrete car.

2. Description of the Prior Art

With reference to FIGS. 1 and 2, there are shown a typical head-up display for an automobile and a typical holographic combiner of the head-up display disclosed in U.S. Pat. No. 4,613,200 respectively. Typically, such a head-up display is only installed in an expensive automobile due to the high cost of the display. In FIG. 1, the reference numeral 10 denotes an optical projection system which is installed in an engine chamber of the automobile. In the optical projection system 10, automobile conditions, such as traveling velocity, rpm, fuel quantity and engine temperature, are converted into electric signals. The signals in turn are converted into image information by a cathode ray tube (CRT) 11 of the optical projection system 10. The image information from the CRT 11 is magnified by an optical lens system 12 and, thereafter, projected on the holographic combiner 20 by means of a reflection mirror 13, so that the combiner 20 displays thereon the automobile conditions in the form of an image. Here, the automobile conditions displayed on the holographic combiner 20 come into the view of a driver 50, so that the above head-up display informs the driver 50 of the automobile conditions.

The above head-up display lets a driver observe various automobile conditions displayed on the combiner 20 mounted to the windshield while watching carefully the forward area (front) of the traveling automobile. Thus, the head-up display not only provides considerable convenience for the driver in operating the automobile, but also prevents possible traffic accidents which may be suddenly generated when the driver temporarily turns down the eyes in order to observe the typical dashboard, which typical dashboard is placed about a steering wheel.

However, the above head-up device has a problem that both the optical projection system and the holographic combiner have complicated constructions and the displayed image on the combiner is often overlapped.

In an effort to overcome the above problem of the head-up display, a holographic combiner which is produced by forming multiple coating layers on a sheet of glass is used. However, this holographic combiner increases the cost of the head-up display due to the multiple coating layers formed on the glass sheet.

In addition, there has been proposed a holographic combiner produced by bonding a hologram optical device to two sheets of glass as shown in FIG. 2. In this case, the hologram optical device 20' is interposed between two sheets of safety glass 1 and bonded to the two sheets of safety glass 1 by means of adhesive 4 (not shown). However, the process for producing this holographic combiner is very complicated and difficult.

Meanwhile, it is noted that careful watching of the forward area of a traveling automobile is more important than observing the dashboard during operation of the automobile.

Particularly when backing up a conventional large truck or a conventional special freight car, such as a container car or a ready mixed concrete car, the driver must back the car based on his experience, viewing the images of the opposed rear side area conditions reflected in the opposed rear mirrors and the image of the backward area conditions reflected in the room mirror.

Furthermore, when the truck or the special freight car is loaded with freight in its freight compartment, the backward (rear) area conditions cannot be reflected in the room mirror due to the freight loaded in the freight compartment, thus to form dead ground in the backward area of the car. In this case, the driver must back the car based on the images of the opposed rear side area conditions reflected in the opposed rear mirrors, while leaving the conditions of the dead ground of the backward area of the car to his conjecture.

In view of intrinsic use of the large truck, it is frequently required to precisely drive the truck to a desired freight unloading place. In the case of a container car which is a kind of special freight car, it is required to precisely drive a tractor to a trailer for coupling the tractor to the trailer without failure. In the case of a ready mixed concrete car, which is a kind of special freight car, it is required to drive the car in order to precisely align the concrete discharge port of the car to a desired concrete pouring position. In this regard, the driver often drives the large truck or the special freight car based on his skill or with help from other people.

The large truck or the special freight car typically has a larger dead ground in its backward area due to its large size, so that the large truck or the special freight car is proved to be a dangerous car, particularly, to a careless pedestrian such as infant.

Therefore, in order to prevent possible traffic accidents due to the dead ground of the backward area of a large truck or of a special freight car, the driver of the car needs to be informed of conditions of the backward area of the car when driving and, more particularly, backing up the car.

SUMMARY OF THE INVENTION

It is, therefore, an object of the present invention to provide a head-up display for an automobile in which the above problems can be overcome and which uses a light transmission hologram optical device as well as a light reflection hologram optical device, to thereby simplify the construction of the head-up display and permits a driver to appropriately adjust the optical path of the display.

It is another object of the present invention to improve a structure of a head-up display, which display has been typically installed in an expensive automobile, and to cost effectively install the head-up display in a large truck or in a special freight car (such as a container car or a ready mixed concrete car) so that the head-up display informs a driver of the large truck or of the special freight car of information of conditions of dead ground of the car. Accordingly, the large truck or the special freight car is effectively operated and possible traffic accidents are prevented due to the dead ground particularly when backing the large truck or the special freight car.

In order to accomplish the above objects, a head-up display for a automobile in accordance with an embodiment of the present invention comprises a holographic combiner having a light reflection hologram optical device mounted to a windshield of the automobile. The head-up display also includes a hologram optical projection system including a light source for emitting light, a liquid crystal display (LCD) for forming visible characters or visible figures, and a light transmission hologram optical device for projecting the light (after passing through the characters or the figures of the LCD) on the holographic combiner.

In the holographic combiner of the head-up display, a transparent shock absorber is coated on an interference pattern surface of a transparent hologram optical device, so that the shock absorber of the combiner prevents possible damage of the interference pattern of the hologram optical device of the combiner due to pressure which will be applied to the combiner when mounting the combiner to the windshield and provides good quality of image for the driver.

The hologram optical projection system of the head-up display includes the light source, the LCD for partially transmitting the light of the light source in accordance with an electric signal, and the light transmission hologram optical device for projecting the light (after being partially transmitted through the LCD) on the combiner mounted to the windshield of the automobile.

In accordance with another embodiment of the present invention, a head-up display comprises information receiving and converting means for receiving information of dead ground conditions of the backward area of the automobile and converting the information into an electric signal. The head-up display also includes an optical projection system for projecting an image on a holographic combiner in accordance with the electric signal applied from the receiving and converting means, to thereby form the image representing the conditions of the dead ground. The head-up display further includes a holographic combiner for displaying thereon the image formed by the optical projection system.

In the head-up display, the information receiving and converting means receives information of the backward (rear) area conditions of the automobile and converts the information into the electric signal, and applies the electric signal to the optical projection system through wire. A CRT of the optical projection system receives the electric signal of the information receiving and converting means and converts the signal into the image. The image from the CRT is enlarged by an optical lens system of the optical projection system and is in turn projected on the holographic combiner.

The holographic combiner reflects the incident image to thereby inform the driver of the conditions of the backward area of the automobile.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
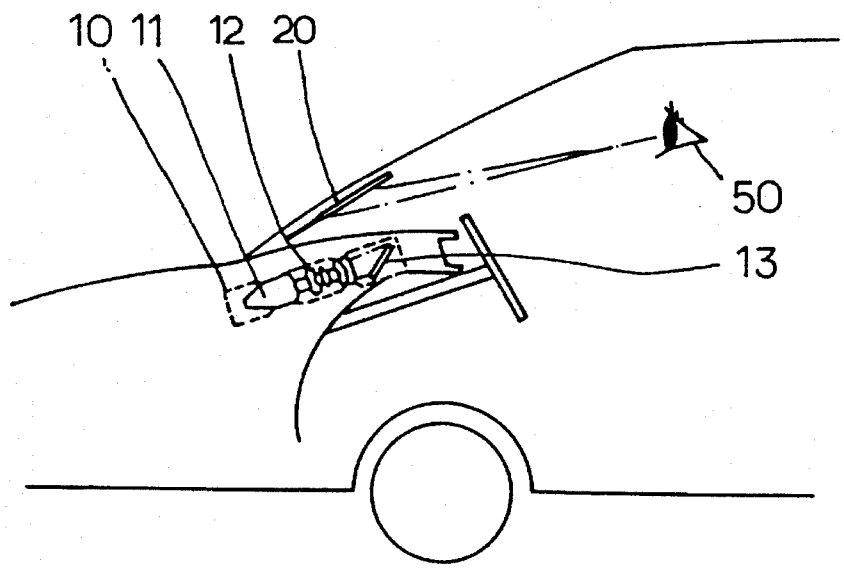
FIG. 1 is a schematic view of a typical head-up display for an automobile.
Figure 2:
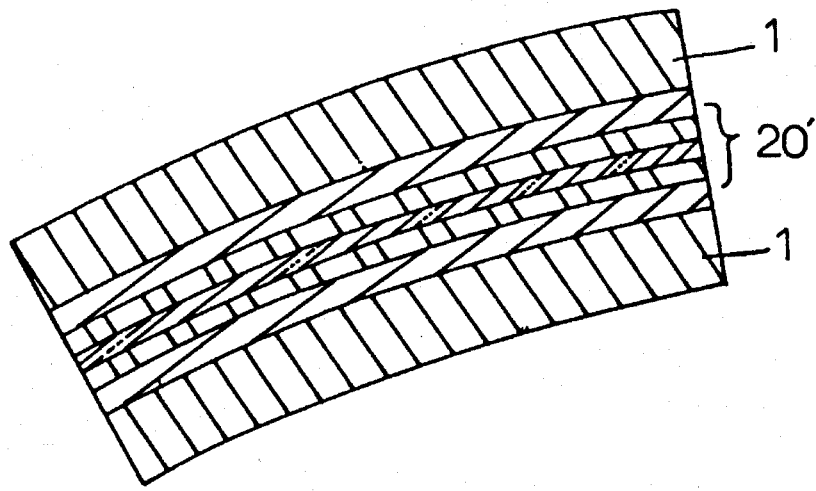
FIG. 2 is a view showing a typical holographic combiner of the head-up display, the combiner being interposed between and bonded to two sheets of glass.
Figure 3:
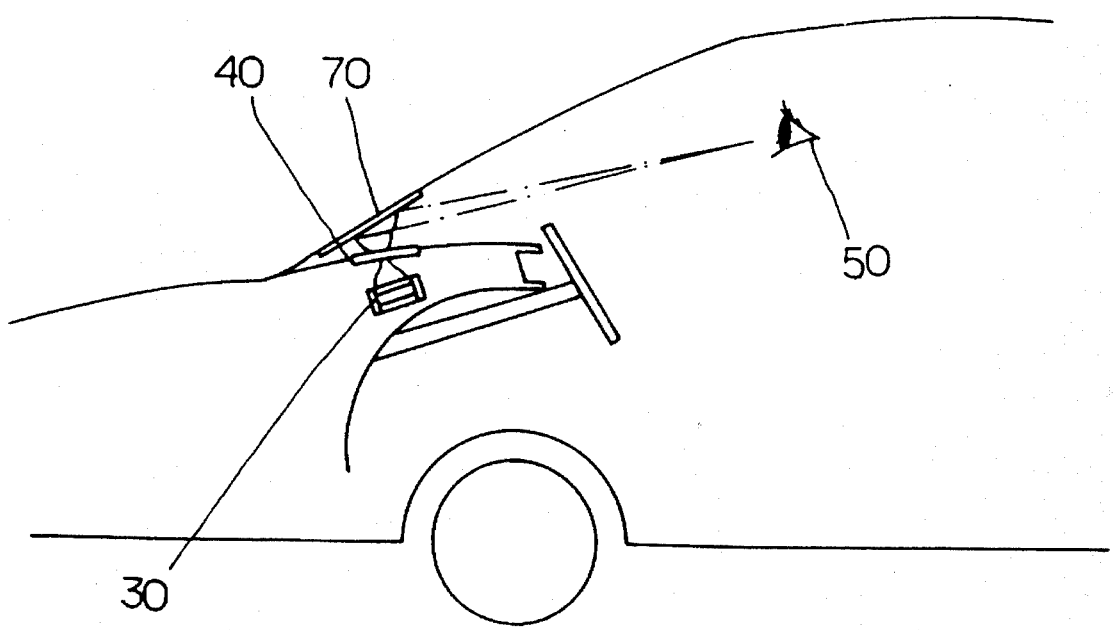
FIG. 3 is a schematic view of a head-up display for an automobile in accordance with an embodiment of the present invention.

With reference to FIG. 3, there is shown in a schematic view a head-up display for an automobile in accordance with an embodiment of the present invention. As shown in this drawing, the head-up display includes a hologram optical projection system 30. The system 30 includes a high brightness of light source and a liquid crystal display (LCD), which LCD partially transmits the light emitted from the light source. The system 30 also includes a light transmission hologram optical device for projecting the light, after being transmitted through the LCD, on a holographic combiner 70 so as to form an image on the combiner 70. In order to prevent infiltration of foreign substances, such as dust, into the hologram optical projection system 30, the system 30 is covered with a system protector 40. The head-up display further includes the holographic combiner 70, which combiner 70 comprises a light reflection hologram optical device and displays the image, representing the automobile conditions, projected by the hologram optical projection system 30 thereon, to thereby permit the image to come into view of a driver 50. Therefore, the combiner 70 informs the driver 50 of the automobile conditions.

Figure 4:
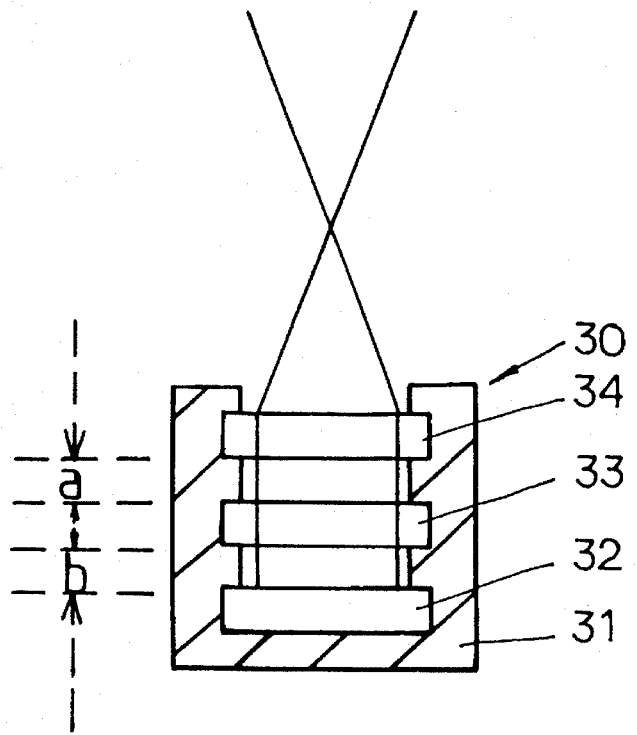
FIG. 4 is a view showing a construction of a hologram optical projection system of the head-up display of FIG. 3.

FIG. 4 shows in detail a construction of the hologram optical projection system 30 of the head-up display of FIG. 3.

Figure 5:
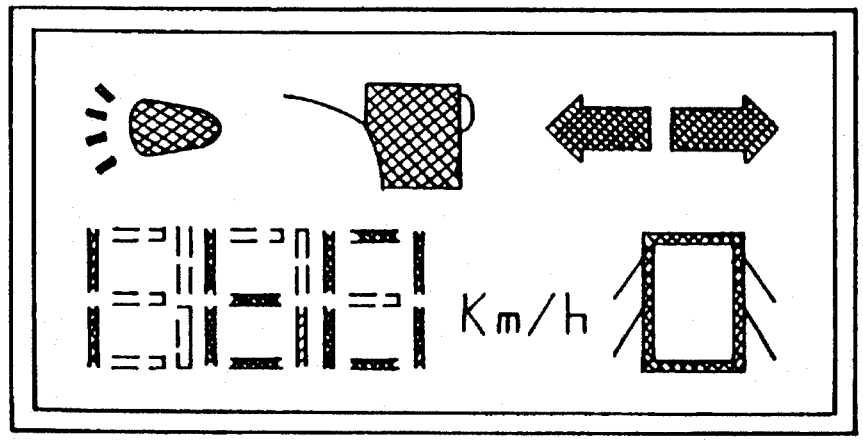
FIG. 5 is a plan view of an LCD of the hologram optical projection system of FIG. 4.

As shown in FIG. 4, the optical elements of the hologram optical projection system 30 are mounted in a holder 31, which holder 31 is a cylindrical or square tube body and maintains the optical axis of the elements. In the holder 31, the light source 32 is placed in the lowest position of the holder 31. The light source 32 may be selected from a high brightness of light source, suitable for evolving a relatively narrow wavelength range of light, and a halogen lamp. Placed in the holder 31 above the light source 32 is the LCD 33, which LCD 33 can be adjusted so as to electrically turn on or off the figures indicative of automobile conditions as shown in FIG. 5. The hologram optical projection system 30 also includes the light transmission hologram optical device 34 for projecting the light (after being transmitted through the LCD 33) on the combiner 70 and for forming an image indicative of automobile conditions on the combiner 70.

In the hologram optical projection system 30, the light emitted from the light source 32 is somewhat diffracted when the light passes though the LCD 33. However, the elements 32, 33 and 34 of the system 30 are spaced apart at very short intervals "a" and "b", so that the diffraction of the light at the LCD 33 is scarcely recognized by the driver 50 and may therefore be neglected.

When the LCD 33 is initially applied with electric power from a power source of the automobile, all the figures of the LCD 33 are totally turned on so that they can transmit the light from the light source. However, the LCD is controlled by OFF signals so as to selectively turn off the figures in accordance with automobile conditions.

Therefore, the LCD 33 partially transmits the light of the light source 32 in accordance with the OFF signal to thereby partially apply the light of the light source 32 to the hologram optical device 34.

Figure 6:
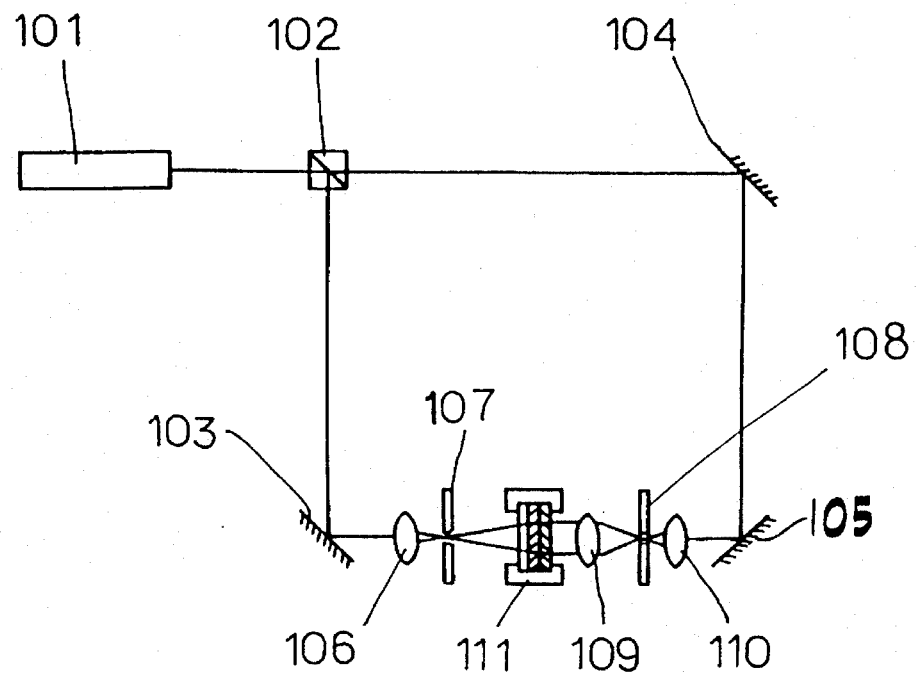
FIG. 6 is a view showing an optical arrangement for manufacture of a hologram optical device of the hologram optical projection system of FIG. 4.
Figure 8:
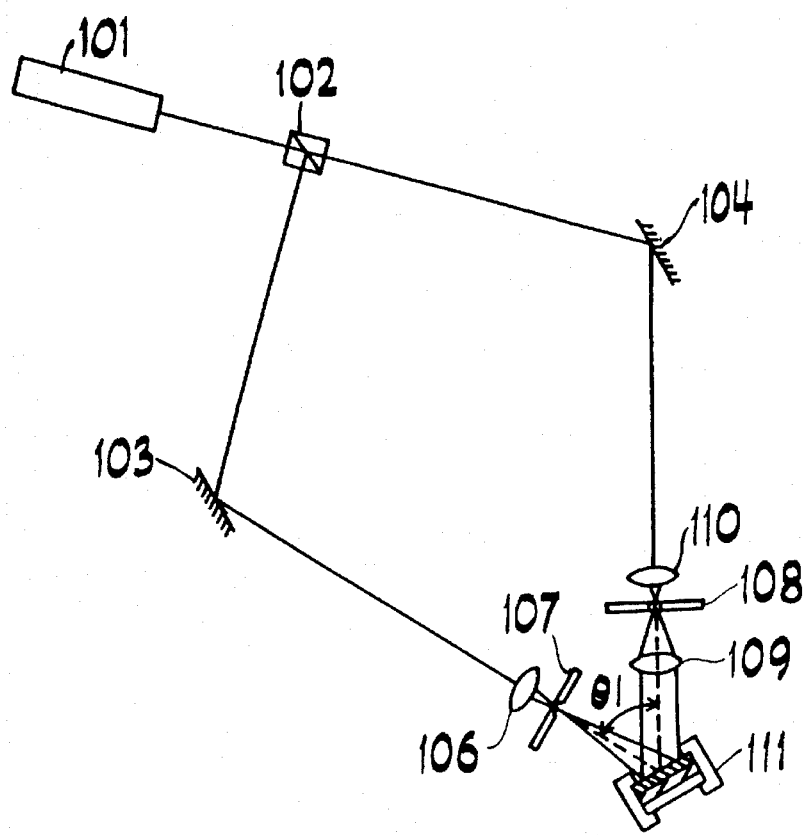
FIG. 8 a view showing an optical arrangement for manufacture of a master hologram of the holographic combiner of the invention.

FIGS. 6 and 8 are views showing optical arrangements for manufacturing the hologram optical device 34 and a master hologram 71 of the holographic combiner 70 of the head-up display of the invention respectively.

The hologram optical device 34 of the optical projection system 30 can be manufactured as follows. That is, the light emitted from a laser source 101 is split into two laser beams of the same intensity by a beam splitter 102 as shown in FIG. 6.

The two laser beams in turn are reflected by a reflection mirror 103 and a pair of reflection mirrors 104 and 105 respectively, so that the two beams are on axis.

In the hologram optical projection system 30, the hologram optical device 34 intends to convert a parallel beam into a spherical wave. In this regard, when manufacturing the hologram optical device 34, a plane wave and a spherical wave should interfere with each other.

Since the light emitted from the laser source 101 is a parallel beam having a small diameter, it is required to convert the light of the laser source 101 into a spherical wave using a lens 106 as well as a pin hole 107.

In addition, as the laser beam passing through the optical path provided by the reflection mirrors 104 and 105 is a parallel beam having a small diameter, this laser beam can be converted into a parallel beam having a larger diameter by a beam expander.

A desired beam diameter can be obtained using a beam expander provided with a spatial filter function, which filter function is caused by a pin hole 108 capable of improving the quality of the parallel beam. Furthermore, good interference can be obtained when making the parallel beam and the spherical wave have the same diameter.

Figure 7:
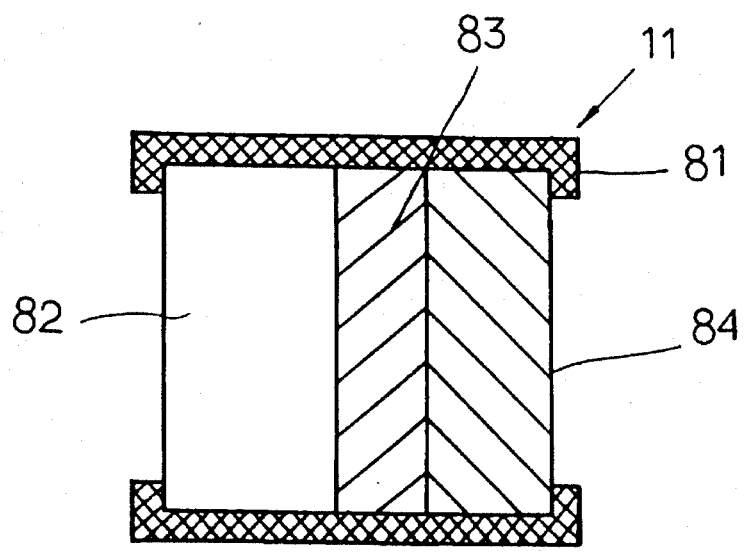
FIG. 7 is an enlarged view of a holographic dry plate of the optical arrangement of FIG. 6.

FIG. 7 is an enlarged view of a holographic dry plate 111 of the optical arrangement of FIG. 6.

As shown in this drawing, the holographic dry plate 111 includes a pair of film holders 81 and a transparent plane plate 82, such as a glass sheet, for holding a flexible film and letting the flexible film keep the plate. The dry plate 111 also includes a substrate 83 coated with a predetermined thickness of photoresisting material 84.

When the plane wave and the spherical wave interfere with each other on the holographic dry plate 111, the plate 111 will become a zone plate in which a circular reinforcing interference crosses with a disappearing interference. In accordance with the light intensity, the photoresisting material 84 coated on the substrate 83 becomes a grating having a relief surface.

After processing the holographic dry plate 111, both the holders 81 and the transparent plane plate 82 are removed from the holographic dry plate 111. The remaining substrate 83 provided with the photoresisting material 84 in the form of grating having the relief surface is, thereafter, developed using a developing solution and fixed, thus to manufacture the hologram optical device 34.

When the hologram optical device 34 is applied with the same parallel beam as that used for manufacturing the device 34, the device 34 converts the incident parallel beam into the same spherical wave as that used for manufacturing the device 34.

When stamping the above hologram optical device 34 as a master device using a stamper, a plurality of hologram optical devices having the same function can be readily reproduced.

In the head-up device, the holographic combiner 70 reflects the spherical wave projected by the hologram optical projection system 30 and lets the spherical wave be focused on the eyes of the driver 50.

Therefore, in order to manufacture the holographic combiner 70, it is required to form an interference pattern by making two spherical waves interfere with each other.

Figure 10:
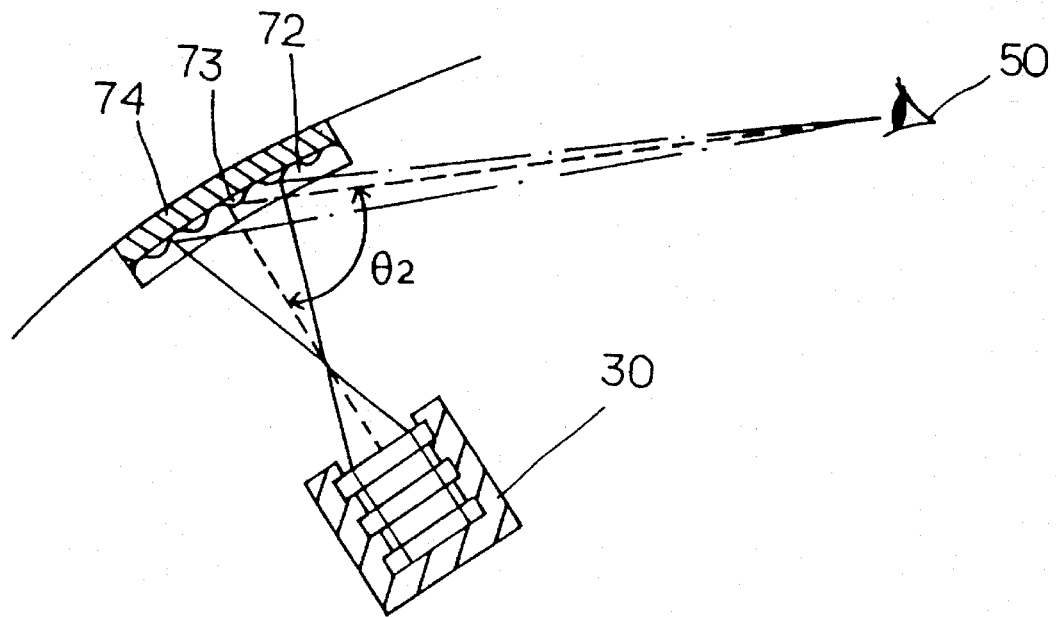
FIG. 10 is a view showing an operation of the head-up display of the invention, with the holographic combiner mounted to a windshield of an automobile by means of an adhesive layer of the combiner.

Since the optical path from the hologram optical projection system 30 to the eyes of the driver 50 is off axis, the optical arrangement for manufacturing a master hologram of the combiner 70 should be off axis as shown in FIG. 8. In addition, it is preferred to make the off-axis angle $\theta_1$ of the optical arrangement of FIG. 8 be equal to the angle $\theta_2$ between the incident beam and the reflection beam of the combiner 70 as shown in FIG. 10.

While FIG. 8 illustrates an off axis optical arrangement (as compared to the on axis arrangement illustrated in FIG. 6), the components forming the optical arrangement illustrated in FIG. 8 are the same (except for the omission in FIG. 8 of reflection mirror 105) as those described above with respect to FIG. 6.

When the resulting holographic combiner 70 is applied with one of the same spherical waves as those used for forming the interference pattern in manufacturing the master hologram 71, the combiner 70 reflects the incident spherical wave in the form of the other spherical wave used for forming the interference pattern. At this time, the incident spherical wave of the combiner 70 is a diverged wave from the hologram optical projection system 30, while the reflection wave of the combiner 70 is a converged wave whose focus length is equal to the distance between the combiner 70 and the eyes of the driver 50.

When selecting the two spherical waves used for forming the interference pattern in manufacturing the master hologram 71 of the holographic combiner 70, the above-described conditions should be considered.

Figure 9:
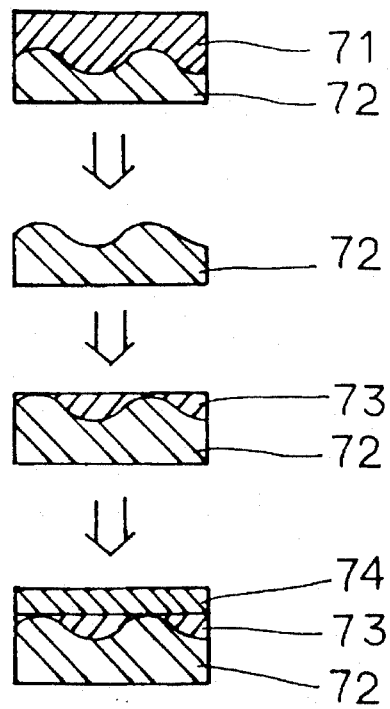
FIG. 9 is a view showing a process for manufacturing the holographic combiner of the head-up display of the invention using the master hologram manufactured by the optical arrangement of FIG. 8.

FIG. 9 is a view showing the process for manufacturing the holographic combiner 70 of the head-up display of the invention.

In the process of manufacturing the holographic combiner 70, a plurality of holographic combiners 70 are stamped using the master hologram 71 which has been produced through the optical arrangement of FIG. 8.

That is, in order to manufacture the holographic combiner, a transparent material having a refractive index similar to that of air is compressed to the master hologram 71, thus to reproduce a master holographic combiner 72. Thereafter, a shock absorber 73 is applied on the relief surface of the master holographic combiner 72 in order to protect the relief surface of the master combiner 72. In this case, the shock absorber 73 is selected from materials having refractive indexes similar to that of the holographic photoresisting material 84.

Thereafter, a transparent adhesive is coated on the interference pattern of the holographic combiner, thus to form a transparent adhesive layer 74 on the interference pattern. With the adhesive layer 74, the holographic combiner can be readily mounted to a desired position of a windshield of an automobile.

FIG. 10 shows operation of the head-up display of the invention, with the holographic combiner mounted to the windshield of the automobile.

As shown in FIG. 10, the holographic combiner is readily mounted to a desired position of the windshield of the automobile due to the adhesive layer 74, so that the light projected by the hologram optical projection system 30 is reflected by the relief surface of the combiner and comes into view of the driver 50.

The invention simplifies the construction of the head-up display of an automobile. As the optical projection system of the head-up display is simplified in its construction, the optical path of the system can be easily adjusted. In addition, the holographic combiner using the light reflection hologram optical device provides good quality of image for a driver in comparison with the typical combiner coated on a glass sheet. Furthermore, the holographic combiner of the invention has an adhesive layer, so that the combiner is easily mounted to a desired position of a windshield of an automobile.

Figure 11:
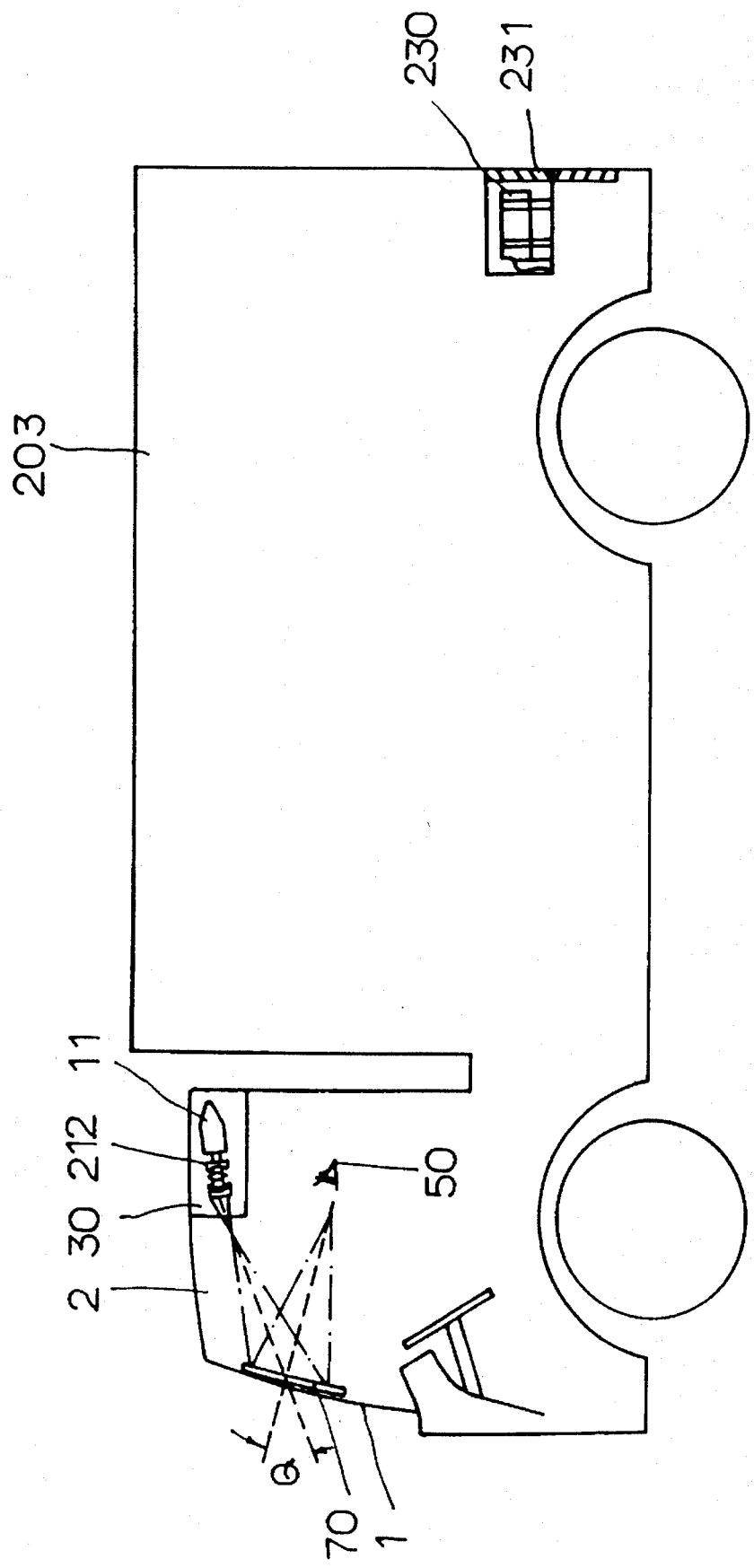
FIG. 11 is view showing a head-up display installed in a large truck in accordance with another embodiment of the invention.

In accordance with another embodiment, the head-up display of the invention may be installed in a large truck 203 as shown in FIG. 11. The head-up display includes information receiving and converting means or a CCD camera 230 for receiving information indicative of conditions of the backward (rear) area of the truck 203, which CCD camera 230 is installed in a lower section of the back of the truck 203. The information received by the CCD camera 230 in turn is converted into an electric signal by an electronic circuit of the CCD camera 230 and applied to a CRT 11 of the hologram optical projection system 30 through wire, which system 30 is installed in a cab of the truck 203. In this embodiment, construction of the optical projection system 30 remains the same as that described for the primary embodiment of FIG. 3.

The optical projection system 30 is mounted to an upper section of the cab of the truck 203. In the optical projection system 30, the electric signal indicative of the information outputted from the CCD camera 230 is received by the CRT 111 of the system 30. Upon reception of the electric signal, the CRT 111 converts the signal into the image. The image in turn is magnified by an optical lens system 212 and projected on the holographic combiner 70, which combiner 70 is mounted to the windshield of the truck 203.

The above holographic combiner 70, whose construction remains the same as that described for the primary embodiment of FIG. 3, simply transmits the image from the forward area of the truck 203, but reflects the image projected by the optical projection system 30. Therefore, the image formed by the optical projection system 30 is displayed on a screen of the combiner 70.

The holographic combiner 70 is mounted to the windshield, preferably to an upper section of the windshield, of the truck 203. Meanwhile, since the lower section of the back of the truck 203, which lower section will be equipped with the CCD camera 230, is apt to be affected by foreign substances, such as dust, the lens of the CCD camera 230 needs to be protected from the foreign substances. In order to achieve the above object, the CCD camera 230 is preferably encased by a camera protection box provided with an openable lid 231. When the CCD camera 230 is not used, the lid 231 closes the camera protection box so as to cover the CCD camera 230 and to prevent the CCD camera 230 from being affected by dust.

Figure 12:
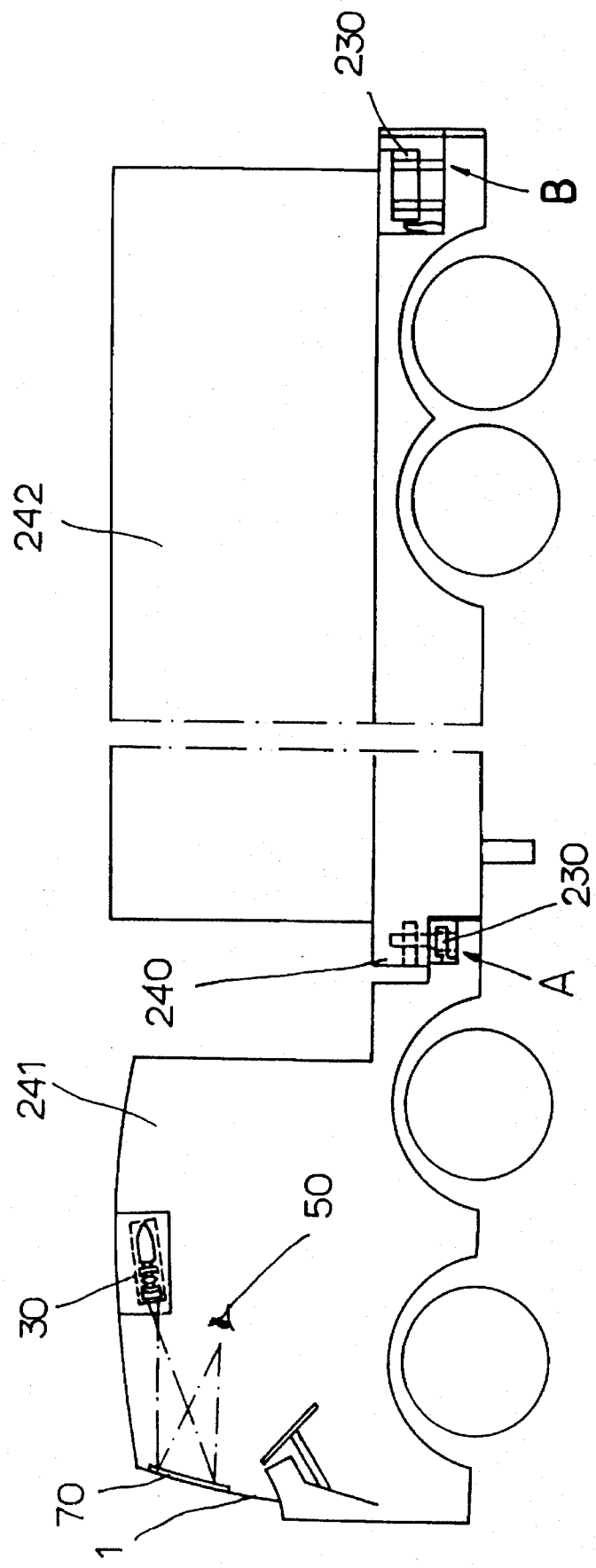
FIG. 12 is a view showing a head-up display installed in a container car, a kind of special freight car, in accordance with still another embodiment of the invention.

Turning to FIG. 12, there is shown the head-up display installed in a container car, a kind of special freight car, in accordance with still another embodiment of the invention. As shown in FIG. 12, the container car typically comprises a tractor 241 and a trailer 242 which are selectively coupled to each other by a coupling means 240. The coupling means 240, which is provided in the back of the tractor 241 and in the front of the trailer 242, couples the trailer 242 to the tractor 241 during container transportation but separates the trailer 242 from the tractor 241 after container transportation.

In the typical trailer car with no head-up display, the driver must drive the tractor 241 and couple or separate the tractor 241 to or from the trailer 242 based upon his experience, viewing the images of the opposed rear side area conditions of the car reflected in the opposed rear mirrors of the tractor 241. Therefore, an unskilled driver cannot readily couple or separate the tractor 241 to or from the trailer 242.

However, when a CCD camera 230 of the head-up display is provided in a part A of the coupling means 240 of the tractor 241 in accordance with the present invention, even an unskilled driver may operate the tractor 241 and couple the tractor 241 to the trailer 242. That is, the CCD camera 230 receives information of the backward (rear) area conditions of the tractor 241 and outputs an electric signal indicative of the information to the hologram optical projection system 30 installed in a cab of the tractor 241. Upon reception of the information signal outputted from the CCD camera 230, the optical projection system 30 converts the signal into an image and projects the image on the holographic combiner 70 mounted to the windshield of the tractor 241, so that combiner 70 displays the image of the backward area of the tractor 241. Therefore, even the unskilled driver may drive the tractor 241 and couple or separate the tractor 241 to or from the trailer 242. In addition, due to another CCD camera 230 is mounted to the back B of the trailer 242 in accordance with the invention, the driver (irrespective of being skilled or unskilled) may readily and accurately separate the tractor 241 from the trailer 242 with no help from other people.

As described in greater detail, the optical projection system 30 of the head-up display of FIG. 12 uses a light transmission LCD 33 whose construction remains the same as that described for the primary embodiment of FIG. 4. As shown in FIG. 4, the LCD 33 has the light transmissive part as well as the light shielding part, so that the LCD 33 partially transmits the light emitted from the background light source 32.

That is, when reversely converting the information of the backward (rear) area conditions of the container car in accordance with the electric signal outputted from the CCD camera 230, the LCD 33 becomes black at the background part of the information, while the LCD 33 becomes white at the image part of the information. The black part of the LCD 33 does not transmit the light from the light source 32, while the white part of the LCD 33 transmits the light from the light source 32. The light, after being transmitted through the white part of the LCD 33, in turn is magnified by a holographic lens and projected on the holographic combiner 70 mounted to the windshield of the tractor 241, thus to form the image of the backward (rear) area of the container car on the combiner 70.

As described above, a head-up display of the invention installed in a large truck shows the driver the backward (rear) area of the car, thus to prevent possible traffic accidents particularly when backing up the car. The head-up display also lets the driver readily determine a freight unloading position while viewing the holographic combiner displaying an image of the backward area of the car thereon, thus to let the car be more effectively operated particularly when unloading the freight. In addition, when the head-up display of the invention is equipped in a special freight car, such as a container car or a ready mixed concrete car, even an unskilled driver readily operates the car while viewing the holographic combiner displaying the image of the backward area of the car, so that the special freight car is more effectively operated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A head-up display for an automobile comprising:

a CCD camera for receiving information of conditions of a backward area of the automobile and for converting the information into an electric signal;

a hologram optical projection system comprising a cathode ray tube (CRT) for converting the electric signal of the CCD camera into an image of the backward area conditions, a light source, a liquid crystal display (LCD) for partially transmitting and shielding the light emitted from the light source in accordance with the electric signal, a light transmission hologram optical device for converting a parallel beam from the LCD into a spherical wave, and a holder for maintaining an optical axis of the hologram optical projection system by holding the LCD and the light transmission hologram optical device; and a holographic combiner comprising a first hologram optical devise reproduced using a master hologram, a shock absorbing layer applied on an interference pattern of the first hologram optical device for protecting the interference pattern, and an adhesive layer applied on the shock absorbing layer, the holographic combiner being mounted on a windshield of the automobile and transmitting an image from a forward area of the automobile and reflecting the image projected by the hologram optical projection system.

2. The head-up display according to claim 1, wherein a camera protection box for housing the CCD camera is mounted to the back of the automobile, the box being provided with an openable lid.

3. The head-up display according to claim 1, wherein the CCD camera is placed in a coupling means of a tractor of a container car, the coupling means being adapted for coupling the tractor to a trailer of the container car.

* * * * *